United States Patent [19]

Porte et al.

[11] Patent Number: 4,727,552
[45] Date of Patent: Feb. 23, 1988

[54] ELECTROOPTICAL DEVICE FOR TUNING AT DYE LASER WAVELENGTH

[75] Inventors: Henri Porte; Jean-Pierre Goedgebuer, both of Besancon, France

[73] Assignee: Etat Francais, France

[21] Appl. No.: 812,058

[22] Filed: Dec. 23, 1985

[30] Foreign Application Priority Data

Dec. 27, 1984 [FR] France .................. 84 19861

[51] Int. Cl.[4] .................................................. H01S 3/10
[52] U.S. Cl. ........................................ 372/20; 372/12; 372/105
[58] Field of Search .................. 372/20, 24, 12, 53, 372/105; 350/404

[56] References Cited

U.S. PATENT DOCUMENTS

| 3,622,912 | 11/1971 | Doyle et al. | 372/105 X |
| 3,766,488 | 10/1973 | Kohn | 372/20 X |
| 3,988,704 | 10/1976 | Rice et al. | 372/12 X |
| 4,081,765 | 3/1978 | Berg et al. | 372/20 X |
| 4,269,481 | 5/1981 | Yeh et al. | 372/105 X |
| 4,548,479 | 10/1985 | Yeh | 350/404 |
| 4,569,053 | 2/1986 | Roullard, III et al. | 372/20 |

OTHER PUBLICATIONS

Holtom et al., "Design of a Birefringent . . . Lasers", IEEE J. Quantum Electron. 1974, pp. 577–579.
Preuss et al., "Three-Stage . . . Design", Applied Optics, vol. 19, No. 5, Mar. 1980, pp. 702–709.

Primary Examiner—Eugene R. LaRoche
Assistant Examiner—Seung Ham
Attorney, Agent, or Firm—Parkhurst & Oliff

[57] ABSTRACT

The invention relates to an electrooptical system mounted in a tunable laser cavity, made up of the association of passive and active birefringent components such as birefringent lenses (29) and electrooptical crystals (9), (10), (11) and (12) introducing a preset or adjustable optical-retardation as a function of the wavelength tuning range. The system is designed to be controlled by a small control voltage, and to tune the wavelength according to an arbitrary scanning law, with a tuning rate that can be high and with an adjustable emission line width.

11 Claims, 3 Drawing Figures

ELECTROOPTICAL DEVICE FOR TUNING AT DYE LASER WAVELENGTH

BACKGROUND OF THE INVENTION

The present invention relates to an electrooptical device for controlling and monitoring the wavelength and emission spectrum of a tunable laser. More specifically, the invention relates to a system designed to be fitted in the cavity of a tunable laser and, controlled by a very small electrical control signal, to tune a laser emission line wavelength over a wide frequency range, in a wavelength domain going from ultra-violet to infrared. The system is designed to tune the wavelength according to an arbitrary wavelength scanning law, at a speed that can be high.

Usually, wavelength tuning devices in tunable lasers such as continuous dye lasers are birefringent filters or diffractive gratings that alter the emission wavelength by rotating the filter in the cavity. The advantage of these systems is their simple design and the narrowness of the emission line they produce. One disadvantage is their low tuning speed, which is limited by the mechanical inertia of the system itself. Another disadvantage is that it is impossible to change the wavelength discontinuously, i.e. to switch from one wavelength to another without going through the intermediate wavelengths.

A second type of wavelength tuning system is the acousto-optical type in which an acoustical wave is used to vary the emission wavelength. The disadvantage here comes from the fact that the system introduces large losses, and can thus be used only with pulsed lasers. Another disadvantage relates to the narrow tuning range, limited to a few angstroms.

A third type of wavelength tuning system comprises electrooptical systems consisting of electrooptical crystals. Different crystal cuts adapted to tunable laser wavelength scanning have been proposed, for example the 45°Z cut or 0°Z cut with transverse electric field. The wavelength is then controlled by an electric signal applied to the electrodes. The disadvantage of this configuration is that the required control voltage is several kilovolts, which limits the use of these systems to tuning spectra of a few angstroms, for technological reasons. Other configurations, such as crystal cuts X45° and 0°Z with longitudinal electrical field, have been proposed. The wavelength is then tuned electrically by inclining the wavelength tuning system inside the laser cavity. In those configurations proposed up till now, the control voltages needed are still relatively high, of the order of a few hundred volts for Rhodamine 6G. The power supplies needed for controlling all of these systems become more sophisticated and costly as the tuning range is extended and the tuning rate is increased. Moreover, the limitation may be introduced, for example in systems including a 0°Z crystal cut with longitudinal electric field, by piezoelectric resonances that make it impossible to change the wavelength at audiofrequency rates.

SUMMARY OF THE INVENTION

The main purpose of the present invention is to offer an electrooptical system designed to be installed inside a tunable laser cavity and optimized so that, with an electrical signal, the emission wavelength can be measured and the wavelength can be changed.

The purpose of the invention is more specifically to use low control voltages, some 25 times less than in the other known systems, for a given emission line width.

Another purpose of the invention consists of allowing wavelength tuning over a broad range, of the order of 400 Å for Rhodamine 6G, and in a wavelength domain going from the ultra-violet to the infrared.

Another purpose of the invention is in the system design, where various components are associated inside a dye laser cavity, assembled in such a way that the wavelength tuning over the spectrum range is controlled with low control voltages of the order of a few volts or a few tens of volts.

Another purpose of the invention is to allow wavelength tuning by small control voltages following a continuous or discontinuous scanning law.

Another purpose of the invention is to allow very brief switching time from one wavelength to another, of the order of the few tens of nanoseconds depending on the type of cavity.

Another purpose of the invention is to design a system in such a configuration that the emission spectrum width can be adjusted simply, while taking advantage of small control voltages.

These goals are achieved by an electrooptical system, to tune the wavelength of a dye laser by a small control voltage, over a range going from the ultra-violet to the infrared, wherein said system comprises an active, sealed head mounted in the cavity laser with an optical axis aligned with the optical axis of the cavity, and including a set of at least two crossed electrooptical crystals cut X45° or Y45°, with a transverse electric field, oriented 90° with respect to each other and having neutral lines lying 45° from the polarization plane of the light inside the said head and of different lengths so that a small nonzero optical retardation $$\Delta = K\lambda_1\lambda_2/(\lambda_1+\lambda_2) \text{ (in } \mu\text{m)}$$

is introduced by natural birefringence matching the scanned range ($\lambda_1$, $\lambda_2$) and at a given emission line, $\lambda_1$ and $\lambda_2$ being the extreme wavelengths of the range and K being an integer, or a number close to an integer, that determines an emission line width, and wherein the sealed active head also includes a passive birefringent component, the natural birefringence of which helps increase the said nonzero optical retardation $\Delta$ and modify or adjust the said emission line width, and wherein the said sealed head includes an index adaptor liquid in which the said crystal and the said passive birefringent component are immersed, and wherein the systems are associated with the active head to apply an adjustable electric voltage to the crystal electrode that introduces an electric field perpendicular to the optical axis of the cavity and, by induction of an additional electric birefringence, to the cavity wavelength.

More particularly, the said passive birefringent component is mounted on a support that is part of an external device adjusting the orientation of the said birefringent component about a preset axis, to allow adjustment of the emission line width.

One possible variation is to fabricate the sealed active head so that it comprises a set of four electrooptical crystals cut X45° or Y45°, which are fitted with electrodes creating a transverse electric field, the neutral lines of the said crystals being oriented 45° from the plane of polarization of the light inside the head, with different lengths to introduce by natural birefringence a small nonzero optical retardation Δ, and which are divided into one pair of crystals oriented in the same direction and of similar lengths, but with antiparallel neutral lines, and a second pair of crystals of similar lengths, with neutral lines antiparallel to each other and which are oriented 90° with respect to the crystals of the first pair of crystals.

Preferably, the retardation Δ introduced by the system of electrooptical crystals is between 0.3 μm and 2.5 μm.

In the same way, the retardation introduced by the passive birefringent component is approximately between 0.3 μm and 0.2 μm.

It is advantageous for the active head to be fitted with windows inclined at Brewster's angle.

The emission wavelength is changed by applying an electrical voltage to the active head. The wavelength changes almost linearly as a function of the control voltage. This voltage is produced by a low voltage generator, or by a TTL signal or by a computer. The electrooptical head can also be controlled by a servo loop monitoring the laser emission wavelength. The wavelength monitoring readout is obtained by measuring the voltage applied to the active head, or by spectrum analysis of the intra-cavity radiation sampled from the active head by an optical fiber aligned with a ray of specular reflection.

The present invention broadens the field of use of electrooptical crystals and transverse electrooptical modulators in applications based on a wavelength change. It also broadens the practical applications of dye lasers and thus helps increase their technical and economic advantages. The wavelength tuning system can be used with different types of applications whenever the wavelength needs to be changed at a high speed, for example of the order of 200 Å/μs, and according to an arbitrary law. The wavelength tuning system can be used in most commercial dye lasers in their standard configuration, with cavities having two or three mirrors, and with laser gyros. It can also be used with other types of tunable lasers, in particular with external cavity laser diodes. The applications concern molecular spectroscopy, intra-cavity spectroscopy, metrology, signal processing and transmission by wavelength modulation.

BRIEF DESCRIPTION OF THE DRAWINGS

Other characteristics and advantages of the invention will be brought out by a description of an embodiment given as an example, in reference to the attached drawings in which.

DESCRIPTION OF THE PREFERRED EMBODIMENT

Figure 1:
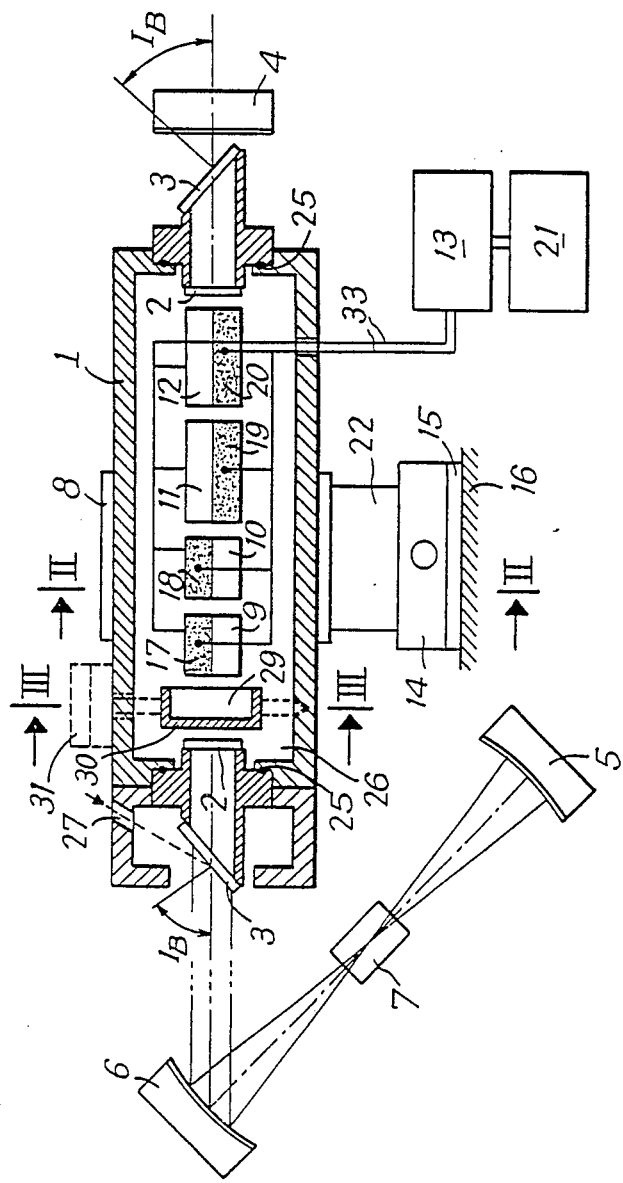
FIG. 1 shows a longitudinal section of an example of the invented device, with an active head placed in the cavity of a dye laser.
Figure 2:
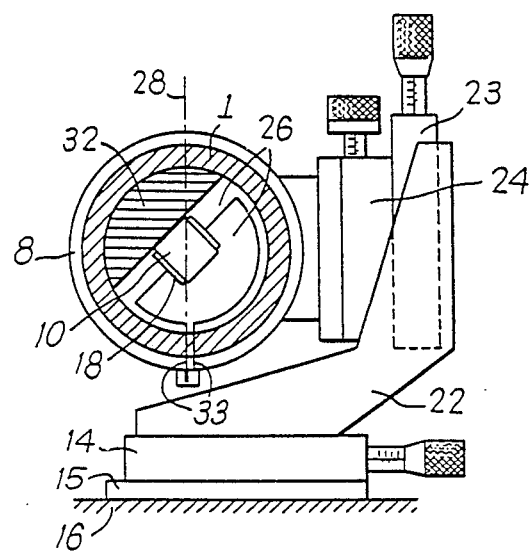
FIG. 2 shows the active head mentioned in FIG. 1, in a transverse section along the plane II—II of FIG. 1.

Enclosure (1), containing the active head, is placed in the cavity of a dye laser with the cavity represented by three mirrors (4, 5, 6) and the laser amplifier medium (7) consisting, for example, of Rh 6G. Enclosure (1) contains four electrooptical crystals (9), (10), (11) and (12), cut X45° or Y45°, of different lengths, aligned in the head axis. Enclosure (1) is held by a sleeve (8) which can be rotated axially and in azimuth and elevation, by elevation rotation plates (14) and azimuth rotation plates (24), mounted on lateral translation plates (15) and vertical translation plates (23). The entire mechanical orientation device, which includes plates (15), (14), (33) and (24), one bracket (22) and sleeve (8), is fastened on platforms (16) in the laser cavity. The enclosure is closed by windows (2) and (3), mounted on O-rings (25) which seal the enclosure (1). The power and emission wavelength of the laser beam is measured on a specular reflection produced by inlet window (3), inclined at Brewster's angle, by means of optical fiber (27).

The active head consists of an association of four electrooptical crystals (9), (10), (11) and (12) of ADP cut at X45° or Y45°, of different lengths, and placed in index adaptor liquid (26). Crystals (9) and (11), like crystals (10) and (12), are oriented 90° from each other, and adjacent crystals (9) and (10), like crystals (11) and (12), are oriented so that their neutral lines are antiparallel.

The arrangement of crystals (9), (10), (11) and (12), supported by support (32) is such that their neutral lines are oriented 45° from polarization plane (28) of the light inside the enclosure. Electrodes (17), (18), (19) and (20) associated with the crystals, are connected by wires (33) to an electric power supply (13). The emission wavelength can be displayed on readout (21) by direct measurement of the control voltage.

The lengths of crystals (9), (10), (11) and (12) are different, so that the natural birefringence causes a predetermined optical retardation Δ as a function of the laser tuning spectrum limits ($\lambda_1$, $\lambda_2$) and of the spectrum width of the desired emission line.

The active head of the device, according to the invention, essentially consists of a set of electrooptical crystals (9), (10), (11) and (12) similar to the crystals used in a transverse electrooptical modulator; but the structure of the modulator is modified so that it is longer functions as an intensity modulator but as an intra-cavity spectrum filter having a spectrum transmission curve that is electrically adjustable. In contrast with the transverse electrooptical modulators used in other applications, the active head is thus designed to introduce by natural birefringence a slight nonzero predetermined optical retardation Δ as a function of the dye laser used. The optical value Δ on which the active head is adjusted optimizes the control voltages and determines the spectrum width of the emission line. The value Δ of the optical retardation at which the active head is set, and as the tuning level α (in Å/V) are respectively:

$$\Delta = K \frac{\lambda_1 \cdot \lambda_2}{\lambda_1 + \lambda_2} \; (\mu m) \quad (1)$$

and $$\alpha = \frac{\lambda_0}{K \cdot V_{\lambda_0/2}} \; (Å/V), \quad (2)$$

where $\lambda_1$ and $\lambda_2$ are the extreme wavelengths of the scanning range, K is a whole or half-integer determining the emission line width and the $\lambda_0/2$ is the half-wave of the system for the wavelength $\lambda_0$. For example, for Rhodamine 6G, the values for Δ are: 0.3 μm, 0.6 μm, 0.9 μm, 1.2 μm, etc., for K = 1, 2, 3, 4, etc. The corresponding emission line widths are of the order of 10 Å, 8 Å, 2 Å, 1 Å, etc. The corresponding tuning levels are then of the order of α=25 Å/V, 12 Å/V, 8 Å/V, 6 Å/V, etc. for a system whose half wave voltage is 200 V.

As an example, it is possible to use four crystals (9), (10), (11) and (12) of ADP having lengths of 15 mm, 14 mm, 26 mm and 24 mm, respectively.

Figure 3:
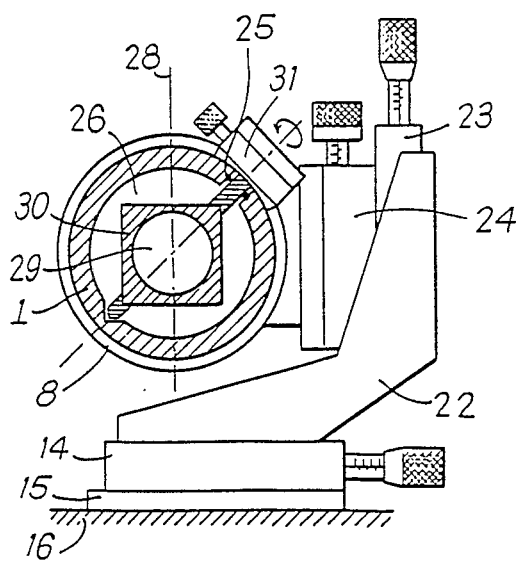
FIG. 3 shows the active head of FIG. 1 in a transverse cross section along III—III of FIG. 1.

By adding a lens (29) with a mechanically adjustable birefringence, the active head can be made to operate with adjustable emission line width by modifying the value of K. In the configuration presented in FIG. 3, the optical retardation Δ is changed by rotating lens (29), installed in mount (30), about a neutral line with rotation plate (31) mounted on seals (25). For a rotation of angle θ, the resulting optical retardation is:

$$\Delta \simeq \frac{\theta^2}{2 \cdot n_o} \left( 1 - \frac{n_o^2}{n_e^2} \right) e, \quad (3)$$

where e is the thickness of the lens and $n_o$ and $n_e$ are the ordinary and extraordinary indices of the crystal used.

The active head (1) thus comprises an association of various birefringent optical components such as birefringent leaves (29) of cut 0°Z, and electrooptical crystal (8), (9), (10) and (11) cut at X45° or Y45°, the optical and geometric characteristics of which are specifically adapted to introducing the set natural birefringence ΔN. This configuration makes it possible to work with crystals of small cross-sectional area, aligned with the optical axes of the cavity, and to optimize the control voltages. Another advantage resides in the possibility of presetting or adjusting the spectrum width of the emission line by adjusting the natural birefringence that comes from the association of the various optical components. The wavelength tuning is achieved by introducing an additional electric birefringence, by applying two electrodes (17), (18), (19) and (20) of crystals (9), (10), (11) and (12) an electric voltage that induces an electric field perpendicular to the optical axes of the cavity.

The electrooptical crystals (9), (10), (11), (12) are preferably sized to create a relatively small retardation Δ, which would be of the order of 0.3 μm, or 0.6 μm for Rhodamine 6G, for example, while birefringent lens (29) is sized and oriented in such a way as to produce an additional delay that could be between approximately 0.3 μm and 2.5 μm, for the same type of dye. The lens (29), the natural birefringence of which can be modified mechanically by the control plate (21) fastened on sealed head (1), thus makes it possible to adjust the laser emission line width by modifying the value of K. The thickness of the lens (29), for example in cords, may be relatively small, for example of the order of 1.2 mm, and still makes it possible to achieve, for example Rhodamine 6G, an emission line width that can go from some ten angstroms to less than one angstrom. Other passive birefringent components can be used in such that the plate (29), for example Babinet or soleil compensator.

By adding an index adaptor liquid (26), i.e. a liquid having an index close to that of crystals (9), (10), (11) and (12), inside the active head of the system, a high coefficient of transmission can be achieved of the order of 25%, to optimize the laser pumping threshold. For Rhodamine 6G, pumped in continuous regime by an argon laser, the pumping threshold is of the order of 2 to 3 W.

In the configuration given in FIG. 1, the presence of the two inlet and outlet windows (3) inclined at Brewster's angle also increases the spectral sensitivity of the device and makes it possible to achieve very fine emission lines while offering the advantage of avoiding the presence of intra-cavity polarizers, if necessary.

Although the invention can be described in the specific framework of a three-mirror dye laser, and with several examples referring to Rhodamine 6G, the invention is not limited to this type of configuration. It also relates to other types of dye lasers and, generally, to any tunable laser with wavelength tuning by spectrum filtering of the longitudinal modes inside the cavity.

What we claim is:

1. Electrooptical device for tuning the wavelength of a dye laser by means of a small control voltage and over a frequency range from ultra-violet to infrared, comprising: a sealed active head fitted in a laser cavity having an optical axis aligned with an optical axis of the cavity, and including a set of at least two crossed electrooptical crystals of cut X45° or Y45° with transverse electric field, oriented 90° with respect to each other, having neutral lines lying at 45° from a plane of polarization of light passing through said sealed active head, and of different lengths so as to introduce, by natural birefringence, a slight nonzero optical retardation:

$$\Delta = K\lambda_1\lambda_2/(\lambda_1+\lambda_2) \text{ (in } \mu m)$$

adapted to the scanned range ($\lambda_1$, $\lambda_2$) and to a given emission line width, $\lambda_1$ and $\lambda_2$ being the extreme wavelengths of the frequency range to be scanned and K being an integer or close to an interger determining an emission line width, and wherein said sealed active head also comprises a passive birefringent component whose natural birefringence helps increase said nonzero optical retardation Δ and adjust said emission line width, and wherein said sealed active head contains an index adaptor liquid in which said crystals and said passive birefringent component are immersed, and wherein circuits are associated with the sealed active head to apply to electrodes connected to said crystals an adjustable electric voltage that induces an electric field perpendicular to the optical axis of the cavity and, by induction of an additional electric birefringence, make it possible to tune the wavelength of laser radiation emerging from the cavity.

2. A device as claimed in claim 1, wherein the said passive birefringent component is mounted on a support secured to an external component which adjusts the orientation of the said birefringent component about a predetermined axis, making is possible to adjust the emission line width.

3. A device as claimed in claim 2, wherein the said passive birefringent component consists of a birefringent lens of cut 0°Z.

4. A device according to claim 1, wherein the said sealed active head comprises a set of four electrooptical crystals, cut X45° or Y45°, which are fitted with electrodes creating a transverse electric field, which present neutral lines lying 45° from a plane of polarization of light passing through the sealed active head, which are of different lengths to introduce by natural birefringence said slight nonzero optical retardation Δ, and which are subdivided into a first pair of crystals, oriented the same way and having similar lengths, but having antiparallel neutral lines, and a second pair of crystals of similar lengths, with antiparallel neutral lines and oriented 90° with respect to the first pair of crystals.

5. A device according to claim 1, wherein the retardation Δ introduced by the set of said electrooptical crystals is between 0.3 μm and 2.5 μm.

6. A device according to claim 1, wherein the additional retardation introduced by said passive birefringent component is between approximately 0.3 μm and 2.5 μm.

7. A device according to claim 1, wherein the sealed active head includes windows inclined at Brewster's angle.

8. A device according to claim 1, wherein said device includes a system for measuring the power supply of the active sealed active head (1) to determine the wavelength of the laser radiation.

9. A device according to claim 1, wherein said device includes an optical fiber fastened on said sealed active head to pick up the laser radiation for spectrum analysis and to facilitate readout of the wavelength and line width of the laser radiation emerging from the cavity.

10. Device according to claim 1, wherein the device includes a low voltage control system such as a TTL signal generator or computer.

11. Device according to claim 1, wherein said device includes a thermostat-controlled enclosure to stabilize the emission wavelength as a function of the temperature.

* * * * *